April 1, 1930. W. T. SMITH 1,752,815
BOTTLE RECEPTACLE
Filed Jan. 14, 1927
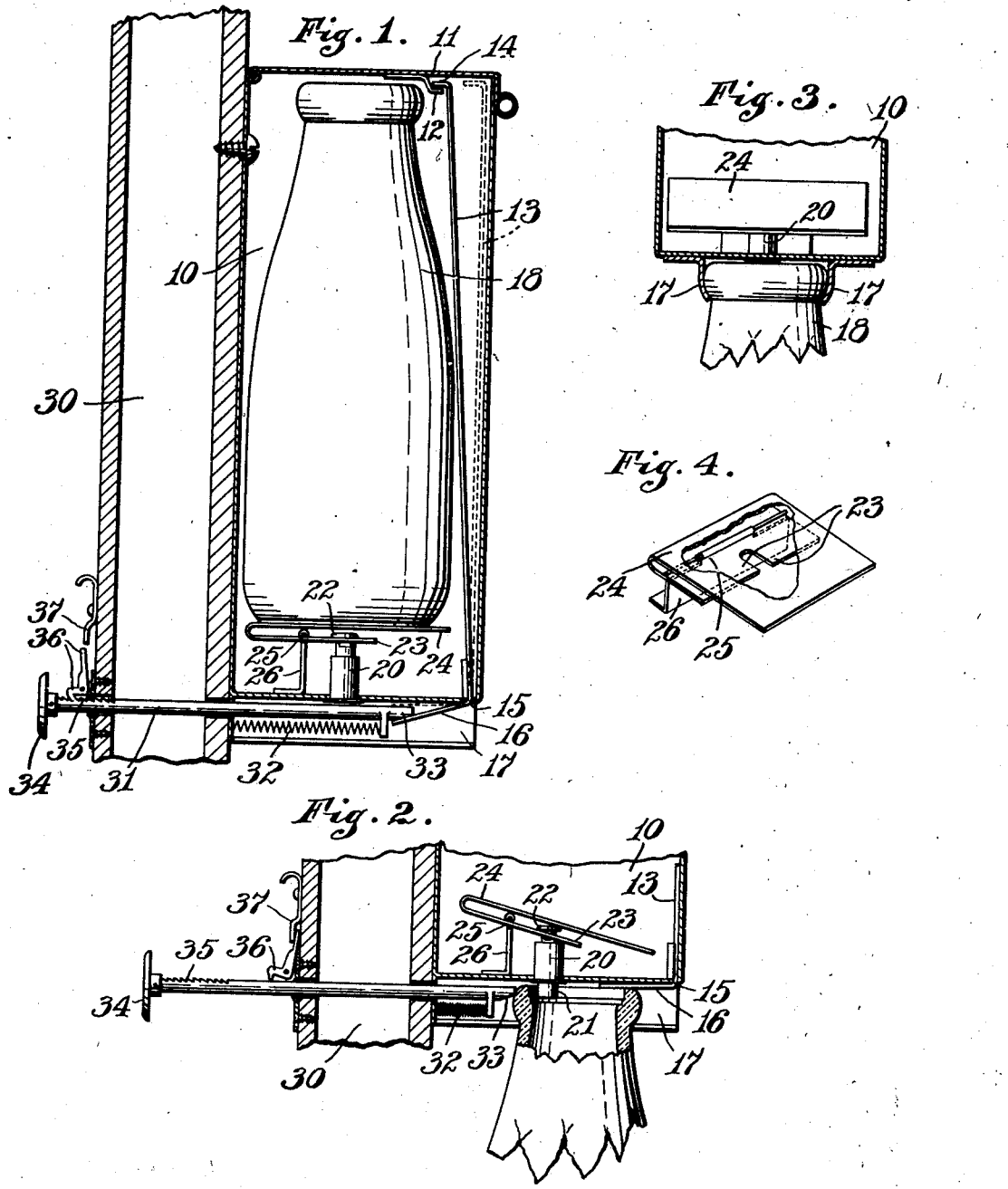
INVENTOR.
William T. Smith,
BY
Hood & Hahn.
ATTORNEYS Patented Apr. 1, 1930

1,752,815

UNITED STATES PATENT OFFICE

WILLIAM T. SMITH, OF MUNCIE, INDIANA

BOTTLE RECEPTACLE

Application filed January 14, 1927. Serial No. 161,033.

The object of my invention is to provide a receptacle for the handling and safe keeping of milk bottles and other similar articles, the arrangement being such that an empty bottle will be held locked until freed by the placing of a full bottle and the filled bottle will be locked against theft until released by proper manipulation of the locking mechanism.
The accompanying drawings illustrate my invention:

Fig. 1 is a central vertical section of my improved device, with the filled bottle in place. Fig. 2 a fragmentary vertical section showing the relation of parts when an empty bottle is in locked position. Fig. 3 a fragmentary vertical section of the parts shown in Fig. 2 on a plane at right angles to that figure and Fig. 4 a detail of the receiving platform for the full bottle.

In the drawings 10 indicates a casing or receptacle, conveniently of sheet metal, of proper size to receive a bottle or other package of the character to be handled, said receptacle being provided with a hinged cover 11 having, on its under face, a catch 12. Mounted within receptacle 10 is a latch 13 having a finger 14 at its upper end formed to co-operate with catch 12. Latch 13 is fulcrumed at 15 in casing 10 and projects through the bottom of said casing at that point and at its lower end is provided with a laterally projecting finger or projection 16 which lies between a pair of laterally separated guide flanges 17—17 secured to the under face of the bottom of receptacle 10 and so formed and spaced as to be capable of slidingly receiving and supporting the mouth of an empty bottle 18.
Mounted about centrally on the bottom of receptacle 10 is the casing 20 of a spring plunger lock 21, the lower end of which is capable of being projected downwardly through the bottom of casing 10 and into the space between the guides 17—17. The upper end of plunger 21 is provided with a head 22 beneath which are projected fingers 23 of a bottle receiving platform 24 fulcrumed at 25 on a support 26, the parts being so proportioned and related that platform 24 and plunger 21 will normally occupy the position shown in Fig. 2 but, when a filled bottle is introduced into casing 10 and supported upon platform 24 the parts will occupy the positions shown in Fig. 1.

The receptacle 10 is supported by any suitable means upon a vertical support 30, such as a door or wall, convenient of access by a delivery man.

Projected through the support 30 and into the space between the guides 17—17 is a locking plunger 31 which is normally projected to the position shown in Fig. 1 by a spring 32. The outer end of plunger 31 is formed at 33, to overlie finger 16 of latch 13 when said latch is in the position shown in full lines in Fig. 1. Conveniently latch 13 is so formed and fulcrumed that it is normally held by gravity in the position shown in full lines in Fig. 1.

The inner end of plunger 31 is provided with a manipulating head or handle 34 and, adjacent said head, with the series of ratchet teeth 35 formed to receive a gravity pawl 36. Pawl 36 may be held in retracted position by sliding catch 37.

The operation is as follows:

With the parts in the position illustrated in Fig. 1 a full bottle being in the receptacle, the cover 11 is locked down due to the fact that the latch 13 is in engagement beneath the catch 12 and is held in this position by the engagement of the outer end 33 of the plunger 31 above the finger 16. The plunger is held against retraction by the pawl 36 which engages the teeth 35. In order to remove the full bottle and to place in position an empty bottle, the operator raises the pawl 36 out of engagement with the teeth 35 locking the same in its raised position by the catch 37. With the plunger 31 thus released, he can with one hand force the plunger rearwardly against the bias of the spring 32. This releases the finger 16 and also permits the insertion of the top of the bottle in the guides 17—17. The top edge of the bottle when inserted in the guides 17—17 engages the finger 16 thereby moving the arm 13 to the dotted position and disengaging the finger 14 from the catch 12. This releases the cover

11 which may be raised permitting the removal of the full bottle. When the full bottle is removed, the pressure is taken off the platform 24 thereby permitting the plunger lock 21 to drop down inside the empty bottle as illustrated in Fig. 2, it being understood that while the full bottle is being removed with one hand, the operator maintains the empty bottle in the position illustrated in Fig. 2 against the tendency of the spring 32 and the plunger 31 to eject the same from the guides. As soon as the plunger lock 21 has dropped inside the neck of the bottle, the bottle may be released as this lock will prevent the empty bottle from being ejected from the guides under the influence of the spring pressed plunger 31. With the empty bottle in the position illustrated in Fig. 2, the receptacle remains unlocked. When, however, a full bottle is deposited in the receptacle it, engaging with the platform 24 raises the plunger lock 21 and the operator by holding the plunger 31 against projection with one hand may remove the empty bottle from the guides 17 with the other. With the empty bottle removed, the finger 33 may drop down into the position illustrated in Fig. 1 and then by allowing the plunger 31 to move forwardly to the position illustrated in Fig. 1, the receptacle is locked because the plunger cannot be retracted due to the engagement of the pawl 36 with the dog 35.

I claim as my invention:

A receptacle of the character described having a movable wall, a latch for retaining said wall against movement, a platform within the receptacle for the reception of an article, means carried by the receptacle for the reception and support of a returnable article, a bolt controlled by the platform and arranged to engage the returnable article when properly placed in said receiving means, a second locking bolt arranged to co-act with said latch and to be engaged by the returnable article when in place, and latching means co-operating with said second bolt.

In witness whereof, I, WILLIAM T. SMITH, have hereunto set my hand at Muncie, Indiana, this 8th day of January, A. D. one thousand nine hundred and twenty-seven.

WILLIAM T. SMITH.